US011422954B2

(12) United States Patent
Pelt et al.

(10) Patent No.: US 11,422,954 B2
(45) Date of Patent: Aug. 23, 2022

(54) TECHNIQUES FOR ACCELERATING MEMORY ACCESS OPERATIONS

(71) Applicant: Intel Corporation, Santa Clara, CA (US)

(72) Inventors: Robert Pelt, Austin, TX (US); Arifur Rahman, San Jose, CA (US); Hong Wang, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 818 days.

(21) Appl. No.: 16/147,241

(22) Filed: Sep. 28, 2018

(65) Prior Publication Data

US 2019/0042494 A1    Feb. 7, 2019

(51) Int. Cl.
*G06F 13/16* (2006.01)
*G06F 12/0862* (2016.01)
*G06F 13/28* (2006.01)

(52) U.S. Cl.
CPC ...... *G06F 13/1668* (2013.01); *G06F 12/0862* (2013.01); *G06F 13/28* (2013.01); *G06F 2212/6026* (2013.01); *G06F 2212/6028* (2013.01); *G06F 2213/28* (2013.01)

(58) Field of Classification Search
CPC .......... G06F 12/02; G06F 13/00; G06T 15/00
See application file for complete search history.

(56) References Cited

U.S. PATENT DOCUMENTS

| 6,078,338 | A | 6/2000 | Horan et al. |
| 6,553,411 | B1 | 4/2003 | Dias et al. |
| 7,337,265 | B2 | 2/2008 | Humphrey et al. |
| 7,444,495 | B1 | 10/2008 | Snider |
| 8,117,137 | B2 | 2/2012 | Xu et al. |
| 9,182,912 | B2 | 11/2015 | Bert et al. |
| 9,256,369 | B2 | 2/2016 | Nazm et al. |
| 9,600,291 | B1 * | 3/2017 | Atsatt .................... G06F 9/4401 |
| 2008/0282033 | A1 * | 11/2008 | Badi ...................... G06F 9/3834 711/117 |
| 2012/0268458 | A1 * | 10/2012 | Gao .......................... G06F 9/38 345/419 |
| 2015/0347051 | A1 * | 12/2015 | Kruglick ............. G06F 9/45558 711/163 |
| 2019/0095343 | A1 * | 3/2019 | Gopal ................. G06F 12/1036 |

OTHER PUBLICATIONS

U.S. Appl. No. 16/019,338, filed Jun. 26, 2018.

* cited by examiner

*Primary Examiner* — Getente A Yimer
(74) *Attorney, Agent, or Firm* — InventIQ Legal LLP; Steven J. Cahill (57) ABSTRACT

A computer system includes a processor circuit, first and second memory systems, and a configurable memory assistance circuit. The processor circuit is used to run at least one application. The application issues a memory access operation. The configurable memory assistance circuit is in communication with the first and second memory systems and the processor circuit. The configurable memory assistance circuit accelerates the memory access operation for the application using data as the data is in transit between the first and second memory systems.

21 Claims, 7 Drawing Sheets

FIG. 7 ns. The configurable memory assistance circuit can, as an example, include configurable logic circuits, as disclosed in further detail herein.

TECHNIQUES FOR ACCELERATING MEMORY ACCESS OPERATIONS

FIELD OF THE DISCLOSURE

The present disclosure relates to electronic circuit systems, and more particularly, to techniques for accelerating memory access operations with configurable memory assistance circuits.

BACKGROUND

Configurable logic integrated circuits can be configured by users to implement desired custom logic functions. In a typical scenario, a logic designer uses computer-aided design tools to design a custom logic circuit. When the design process is complete, the computer-aided design tools generate configuration data. The configuration data is then loaded into configuration memory elements that configure configurable logic circuits in the integrated circuit to perform the functions of the custom logic circuit. Configurable logic integrated circuits can be used for co-processing in big-data or fast-data applications. For example, configurable logic integrated circuits may be used in application acceleration tasks in a datacenter and may be reprogrammed during datacenter operation to perform different tasks.

DETAILED DESCRIPTION

According to some embodiments disclosed herein, a computer system includes a processor circuit, memory systems, and a configurable memory assistance circuit. An application running on the processor circuit can issue a memory access operation to access data. The configurable memory assistance circuit accelerates the memory access operation by performing computations for the application using the data as the data is in transit between a first one of the memory systems and a second one of the memory systems. The configurable memory assistance circuit can, as an example, include configurable logic circuits, as disclosed in further detail herein.

Figure 1:
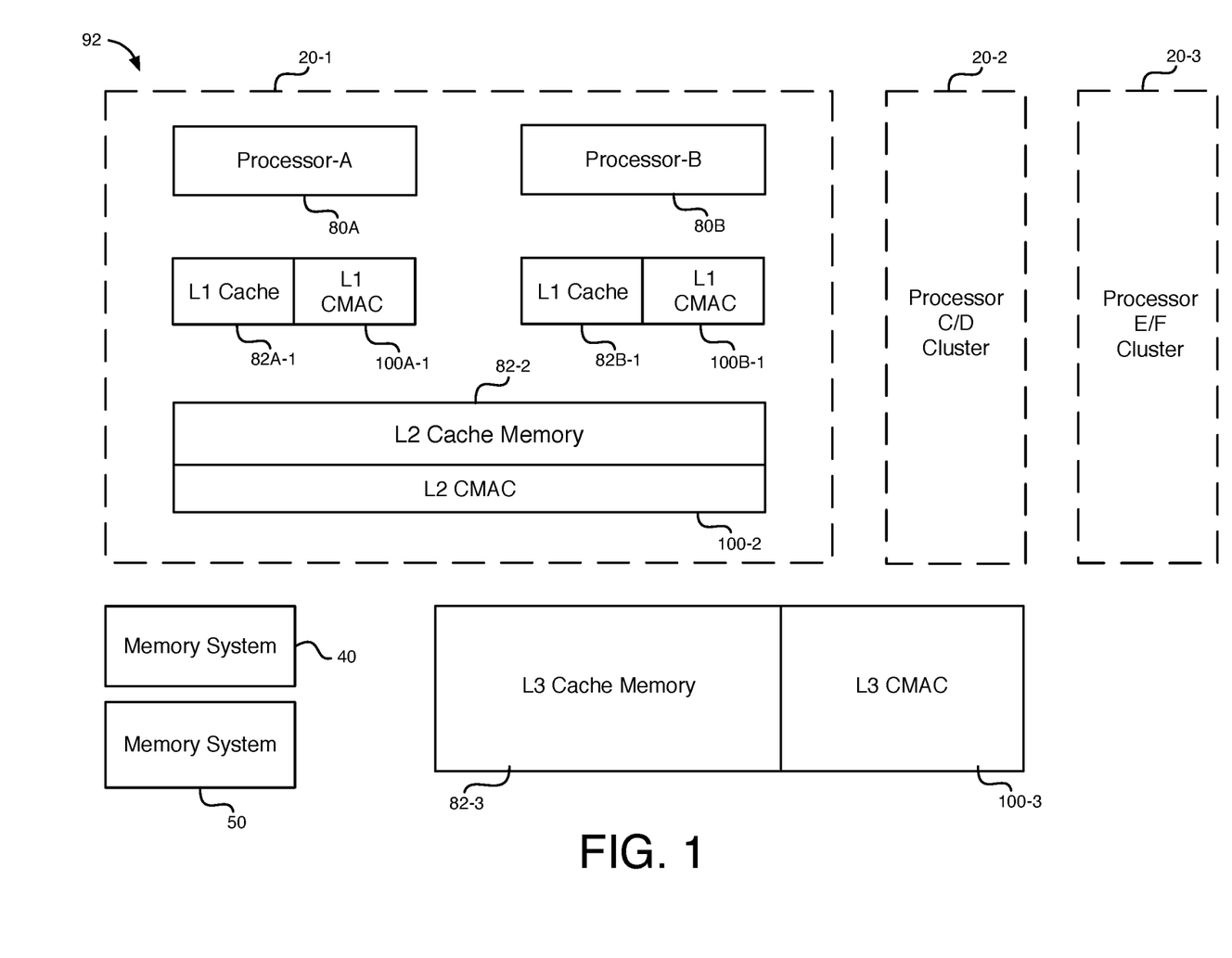
FIG. 1 is a diagram showing a computer system having multiple processor circuits, cache memory circuits, and configurable memory assistance circuits, according to an embodiment.

FIG. 1 is a diagram showing a computer system 92 having multiple processor circuits, cache memory circuits, and configurable memory assistance circuits, according to an embodiment. In accordance with an embodiment, computer system 92 may include configurable memory assistance circuits (CMAC) 100 for accelerating memory access operations as data is transferred between memory systems.

As shown in Figure (FIG. 1, computer system 92 includes a first processor cluster 20-1, a second processor cluster 20-2, and a third processor cluster 20-3. First processor cluster 20-1 includes a first processor circuit 80A, a second processor circuit 80B, first level L1 cache memory circuits 82A-1 and 82B-1, first level L1 configurable memory assistance circuits (CMAC) 100A-1 and 100B-1, a second level L2 cache memory circuit 82-2, and a second level L2 CMAC 100-2. System 92 also includes a third level L3 cache memory circuit 82-3 and a third level L3 CMAC 100-3. L3 memory 82-3 can contain substantially more memory storage space than any of the L1 or L2 memories. In an exemplary embodiment, L3 cache memory 82-3, CMAC 100-3, and the circuitry in processor clusters 20-1, 20-2, and 20-3, including the L1 and L2 cache and CMACs are all in a single integrated circuit die. Cache memory circuits 82A-1, 82B-1, 82-2, and 82-3 are collectively referred to herein as cache memory circuits 82 or cache memory systems 82.

FIG. 1 also illustrates a memory system 40 and a memory system 50. Memory systems 40 and 50 can be external to system 92 or part of system 92. Memory systems 40 and 50 can, for example, be connected to system 92 through one or more Universal Serial Bus (USB) cables, PCI Express buses, FireWire buses, etc. As another example, one or both of memory systems 40 and 50 can be memory devices that are on the same circuit board as system 92. Examples of one or both of memory systems 40 and 50 include hard disk drives, non-volatile solid state drive (SSD) memory devices, and synchronous dynamic random-access memory (SDRAM) devices. Memory systems 40 and 50 can be the same types of memory devices or different types of memory devices. As a specific example, memory system 40 can be an SDRAM device, and memory system 50 can be an SSD device or a hard disk drive.

Each of the L1 cache memory circuits 82A-1 and 82B-1, the L1 CMACs 100A-1 and 100B-1, the L2 cache memory circuit 82-2, the L2 CMAC 100-2, the L3 cache memory circuit 82-3, the L3 CMAC 100-3, and memory systems 40 and 50 can communicate directly or indirectly with processors 80A and/or 80B through signal lines not shown in FIG. 1. In addition, each of the L1 cache memory circuits 82A-1 and 82B-1, the L1 CMACs 100A-1 and 100B-1, the L2 cache memory circuit 82-2, the L2 CMAC 100-2, the L3 cache memory circuit 82-3, the L3 CMAC 100-3, and memory systems 40 and 50 can communicate with each other directly or indirectly through signal lines not shown in FIG. 1.

Configurable memory assistance circuits 100 can be implemented using configurable ("soft") logic circuitry and are sometimes referred to as reconfigurable, adaptable, or adjustable memory assist circuits. Configurable memory assistance circuits 100 may be dynamically reconfigured based on application usage profiles. According to various embodiments, the processor circuits 80 of FIG. 1 can be any types of processor circuits, such as central processing units (CPUs), graphics processing units (GPUs), digital signal processors (DSPs), network processors, or other suitable types of processing circuitry.

The addition of configurable memory assistance circuits to a computer system allows the application developer to have a customized memory system for each problem. These customized memory solutions can be created as pre-compiled libraries or generated at compile-time. When the application is invoked by the system, the configurable memory assistance circuits can be configured simultaneously. Significant performance advantages can be realized by generating application-specific memory solutions. The addition of configurable memory assistance circuits for custom memory can also lower power as data movement can be significantly reduced.

An integrated circuit design tool can be configured to identify memory access patterns performed by a processor and can be configured to match the identified memory access patterns to a selected memory access template in a library of predetermined memory access templates. The selected memory access template can then be parameterized and synthesized to generate a configuration file for a configurable memory assistance circuit that is used to accelerate memory access operations for the processor.

During runtime, an operating system running on a processor can load an application that can be accelerated by the configurable memory assistance circuit. The operating system can determine the compatibility between the configurable memory assistance circuit and the current hardware resources on the system, make runtime decisions for mapping memory access requests to available configurable memory assistance circuits, and prioritize different workloads. This technique allows application developers to exploit configurable memory assistance circuits to improve performance, allows in-system upgrades, and can also help improve memory security.

L1 memory 82A-1 and 82B-1 are built closer to processors 80A-80B than L2 memory 82-2, so accessing L1 memory 82A-1 and 82B-1 is usually faster than accessing L2 memory 82-2. Similarly, L2 memory 82-2 is built closer to the processors 80A and 80B than L3 memory 82-3, so accessing L2 memory 82-2 is usually faster than accessing L3 memory 82-3. L3 memory 82-3 can, for example, be a memory circuit that is in the same integrated circuit (IC) die, IC package, or circuit board as clusters 20-1, 20-2, and 20-3. Cache memory systems 82 can be used to temporarily store data so subsequent requests from processors 80A and 80B can be served faster as opposed to retrieving the data from external memory 40 and 50, which is much slower relative to cache memory.

In the embodiment of FIG. 1, an application running on processor circuit 80A or 80B can issue a memory access operation to access data. A memory access operation can include, for example, a request to read data from a memory system or write data to a memory system. Each L1 cache memory circuit is generally dedicated to a single processor circuit 80. Thus, processor circuits 80A and 80B can access cache memory circuits 82A-1 and 82B-1, respectively. Processor circuit 80A can issue memory access operations to access data (e.g., read data from or write data to a memory system). In response to a memory access operation issued by processor circuit 80A to access data, a cache memory controller circuit determines whether the data is to be transferred between memory systems. The cache memory controller circuit may, for example, determine that the data indicated by the memory access operation is to be transferred between the cache memory circuit 82A-1 and one of memory systems 82B-1, 82-2, 82-3, 40, or 50. As a specific example, data requested by a read operation issued by processor 80A may be stored in memory system 40 or 50. In response to the read operation, the requested data can be transferred from memory system 40 or 50 to cache memory circuit 82A-1 and then to processor 80A. As another specific example, data that is stored in cache memory 82A-1 during a write operation issued by processor 80A can be subsequently transferred to memory system 40 or 50. The memory access operation can be accelerated by configurable memory assistance circuit 100A-1 as the data is transferred between L1 cache memory circuit 82A-1 and any one of memory systems 82B-1, 82-2, 82-3, 40, or 50.

Processor circuit 80B can issue memory access operations to access data (e.g., read data from or write data to a memory system). In response to a memory access operation issued by processor circuit 80B to access data, a cache memory controller circuit determines whether the data is to be transferred between memory systems. The cache memory controller circuit may, for example, determine that the data indicated by the memory access operation is to be transferred between cache memory 82B-1 and one of memory systems 82A-1, 82-2, 82-3, 40, or 50. As a specific example, data requested by a read operation issued by processor 80B can be transferred from memory system 40 or 50 to cache memory circuit 82B-1 and then to processor 80B. As another specific example, data that is stored in cache memory 82B-1 during a write operation issued by processor 80B can be subsequently transferred to memory system 40 or 50. The memory access operation can be accelerated by configurable memory assistance circuit 100B-1 as the data is being transferred between L1 cache memory circuit 82B-1 and any one of memory systems 82A-1, 82-2, 82-3, 40, or 50.

Both processor circuits 80A and 80B can access L2 cache memory circuit 82-2 (i.e., L2 cache 82-2 may be shared between processor circuits 80A and 80B). In response to a memory access operation issued by processor circuit 80A or 80B to access data, a cache memory controller circuit determines whether the data is to be transferred between memory systems. The cache memory controller circuit may, for example, determine that the data indicated by the memory access operation is to be transferred between cache memory circuit 82-2 and one of memory systems 82A-1, 82B-1, 82-3, 40, or 50. As a specific example, data requested by a read operation issued by processor 80A or 80B can be transferred from memory system 40 or 50 to cache memory circuit 82-2 and then to the requesting processor. The memory access operation can be accelerated by configurable memory assistance circuit 100-2 as the data is being transferred between L2 cache memory circuit 82-2 and any one of memory systems 82A-1, 82B-1, 82-3, 40, or 50.

Each of the second and third processor clusters 20-2 and 20-3 can include one or more additional processor circuits. In some embodiments, each of the processor clusters 20-2 and 20-3 can have the same circuits in the same configuration shown in FIG. 1 for processor cluster 20-1. In the example of FIG. 1, each of the processor circuits in processor clusters 20-1, 20-2, and 20-3 can access L3 cache memory 82-3 (i.e., L3 memory 82-3 may be shared between at least two different processor clusters). Each of the processor circuits in processor clusters 20-1, 20-2, and 20-3 can issue memory access operations to access data. In response to a memory access operation issued by one of the processor circuits in one of the clusters 20 to access data, a cache memory controller circuit determines whether the data is to be transferred between memory systems. The cache memory controller circuit may, for example, determine that the data indicated by the memory access operation is to be transferred between cache memory circuit 82-3 and one of memory systems 82A-1, 82B-1, 82-2, 40, or 50. As a specific example, data that is stored in cache memory 82-3 during a write operation issued by a processor in one of clusters 20 can be subsequently transferred to memory system 40 or 50. The memory access operation can be accelerated by configurable memory assistance circuit 100-3 as the data is being transferred between L3 cache memory 82-3 and any one of memory systems 82A-1, 82B-1, 82-2, 40, or 50. As other examples, any one of the configurable memory assistance circuits 100 can accelerate memory access operations issued by one or more processors as the data is in transit between two external memory systems, such as between memory system 40 and memory system 50.

The arrangement of FIG. 1 where the two processors in cluster 20-1 share a common L2 cache and where 3 different processor clusters share a common L3 cache memory is merely illustrative. If desired, an L2 cache can be dedicated to a single processor or can be shared among three or more processors or two or more processor clusters, an L3 memory can be shared among two, four, or more processor clusters, etc.

The components of computer system 92 can be formed as part of a single integrated circuit die (as a system-on-chip or "SoC"), as multiple integrated circuit dies within a single multichip package, as parts of different packages on a circuit board, as parts of different circuit boards in a distributed system, etc. In general, system 92 can be a digital system or a hybrid system that includes both digital and analog subsystems. System 92 may be used in a wide variety of applications as part of a larger computing system, which may include but is not limited to: a datacenter, a computer networking system, a data networking system, a digital signal processing system, a graphics processing system, a video processing system, a computer vision processing system, a cellular base station, a virtual reality or augmented reality system, a network functions virtualization platform, an artificial neural network, an autonomous driving system, a combination of at least some of these systems, and/or other suitable types of computing systems.

Figure 2:
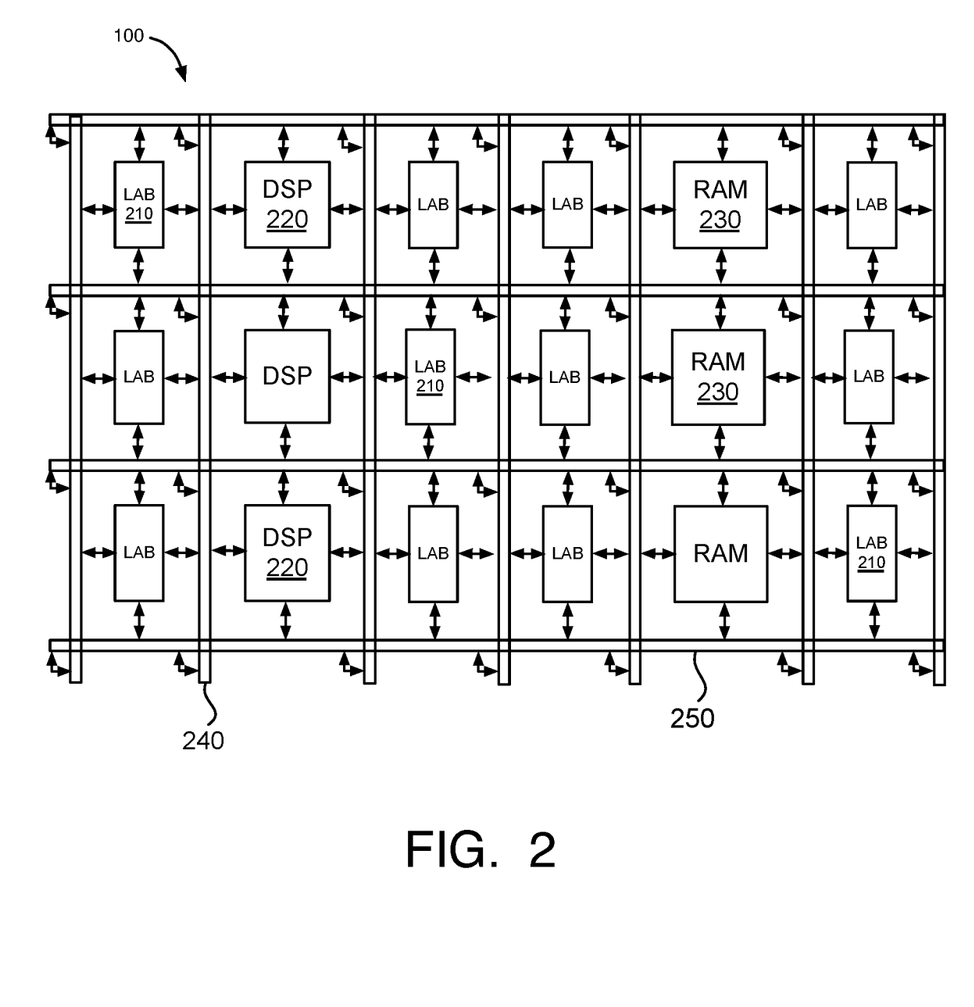
FIG. 2 illustrates a two-dimensional array of configurable functional circuit blocks that can be used to implement one or more of the configurable memory assistance circuits, according to an embodiment.

The configurable memory assistance circuits distributed among the processors' cache memory hierarchy may be implemented, for example, using configurable logic circuitry. As shown in FIG. 2, one, a subset of, or all of the configurable memory assistance circuits 100 can include a two-dimensional array of configurable functional circuit blocks, including configurable logic array blocks (LABs) 210 and other functional circuit blocks, such as random access memory (RAM) blocks 230 and digital signal processing (DSP) blocks 220. Functional blocks such as LABs 210 can include smaller configurable regions (e.g., logic elements, logic blocks, or adaptive logic modules) that receive input signals and perform custom functions on the input signals to produce output signals. LABs 210 can include combinational and sequential logic circuitry. The combinatorial circuitry can, for example, include look-up tables and/or product term circuits. The sequential circuitry can, for example, include registers. The LABs 210 can be configured to perform custom logic functions. If desired, the functional blocks can be arranged in more levels or layers in which multiple functional blocks are interconnected to form still larger blocks. Other arrangements may use functional blocks that are not arranged in rows and columns.

In addition, each configurable memory assistance circuit 100 can also include programmable interconnect circuitry in the form of vertical routing channels 240 (i.e., interconnects formed along a vertical axis of circuit 100) and horizontal routing channels 250 (i.e., interconnects formed along a horizontal axis of circuit 100), each routing channel including at least one track to route at least one wire.

Note that other routing topologies, besides the topology of the interconnect circuitry depicted in FIG. 2, may be used. For example, the routing topology may include wires that travel diagonally or that travel horizontally and vertically along different parts of their extent as well as wires that are perpendicular to the device plane in the case of three dimensional integrated circuits. The driver of a wire may be located at a different point than one end of a wire.

Each configurable memory assistance circuit 100 can contain programmable memory elements. Memory elements can be loaded with configuration data. Once loaded, the memory elements each provide a corresponding static control signal that controls the operation of an associated configurable functional block (e.g., LABs 210, DSP blocks 220, or RAM blocks 230).

In a typical scenario, the outputs of the loaded memory elements are applied to the gates of metal-oxide-semiconductor field-effect transistors (MOSFETs) in a functional block to turn certain transistors on or off and thereby configure the logic in the functional block including the routing paths. Configurable logic circuit elements that can be controlled in this way include parts of multiplexers (e.g., multiplexers used for forming routing paths in interconnect circuits), look-up tables, logic arrays, AND, OR, NAND, and NOR logic gates, pass gates, etc.

The programmable memory elements can be organized in a configuration memory array consisting of rows and columns. A data register that spans across all columns and an address register that spans across all rows can receive configuration data. The configuration data may be shifted onto the data register. When the appropriate address register is asserted, the data register writes the configuration data to the configuration memory bits of the row that was designated by the address register.

Figure 3:
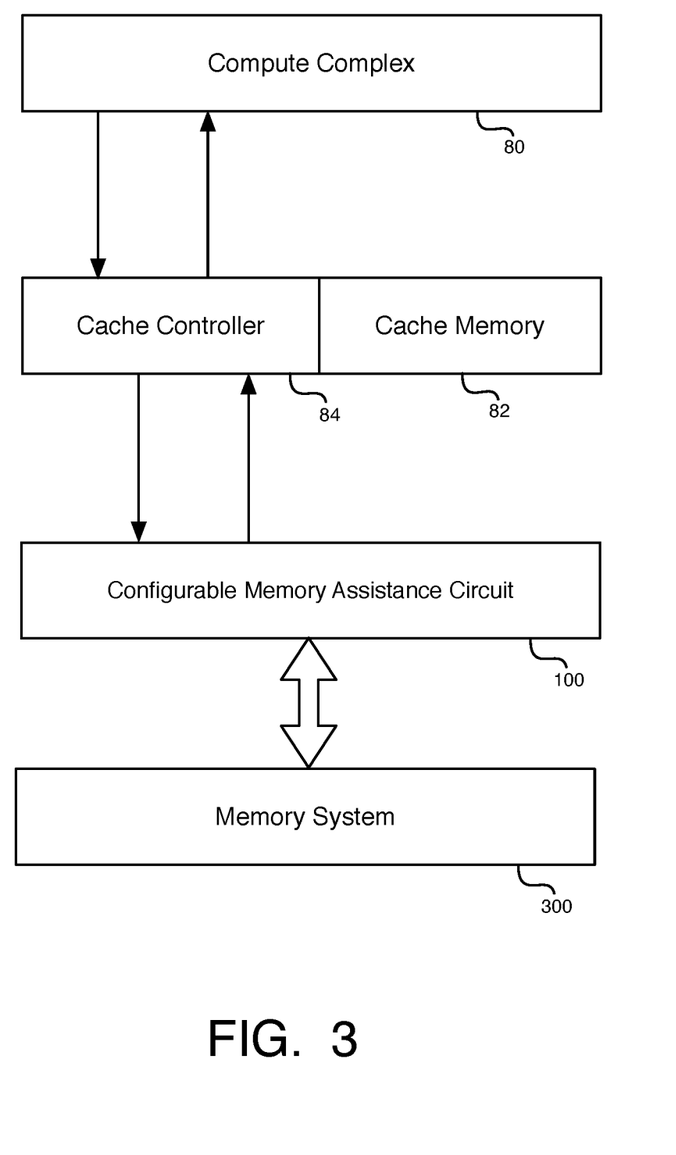
FIG. 3 illustrates an example of a configurable memory assistance circuit that is between a cache memory controller and a next level memory system, according to an embodiment.

In some embodiments, a configurable memory assistance circuit 100 is placed between a cache memory controller and a next level memory system to accelerate memory access operations from a processor. FIG. 3 illustrates an example of a configurable memory assistance circuit that is between a cache memory controller and a next level memory system, according to an embodiment. The system of FIG. 3 includes a compute complex 80, a cache memory controller circuit 84, a cache memory circuit 82, a configurable memory assistance circuit 100, and a memory system 300. The compute complex 80 can include any one or more of the processors 80A-80B and/or the processors in another processor cluster of FIG. 1. Cache memory circuit 82 can include any one or more of the cache memory circuits 82A-1, 82B-1, 82-2, or 82-3 of FIG. 1. Configurable memory assistance circuit 100 can include any one or more of the configurable memory assistance circuits (CMAC) 100A-1, 100B-1, 100-2, or 100-3 of FIG. 1. Memory system 300 can be, for example, memory system 40, memory system 50, or a higher level cache memory circuit than the cache memory circuit 82 shown in FIG. 3.

In the embodiment of FIG. 3, in response to a memory access operation generated by compute complex 80 to access data, cache memory controller 84 determines whether the data is to be transferred between memory systems. For example, cache memory controller 84 may determine that the data indicated by the memory access operation is to be transferred between cache memory 82 and memory system 300. Data transferred between cache memory 82 and memory system 300 in response to the memory access operation are routed through cache memory controller circuit 84 and through the configurable memory assistance circuit 100. The configurable memory assistance circuit 100 accelerates the memory access operations generated by compute complex 80, for example, by performing computations for an application running on the compute complex 80 using the data as the data is in transit between cache memory 82 and memory system 300.

Figure 4:
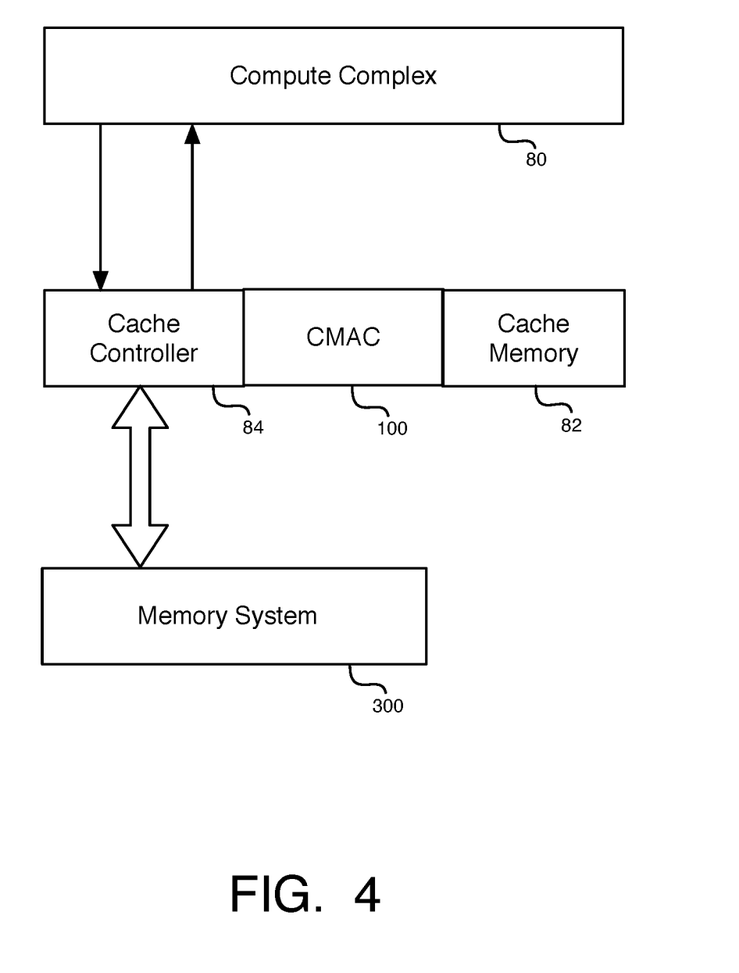
FIG. 4 illustrates an example of a configurable memory assistance circuit that is between a cache memory controller and a cache memory circuit, according to an embodiment.

In some embodiments, a configurable memory assistance circuit 100 is placed between a cache memory controller and a cache memory circuit to accelerate memory access operations generated by a processor. FIG. 4 illustrates an example of a configurable memory assistance circuit that is between a cache memory controller and a cache memory circuit, according to an embodiment. The system of FIG. 4 includes a compute complex 80, a cache memory controller circuit 84, a cache memory circuit 82, a configurable memory assistance circuit 100, and a memory system 300.

Cache memory controller circuit 84 controls memory access operations generated by compute complex 80 to access cache memory circuit 82. Cache memory controller circuit 84 controls the flow of data between compute complex 80 and cache memory circuit 82. As an example, cache memory controller circuit 84 can control operations generated by compute complex 80 to write data to and read data from cache memory circuit 82.

In the embodiment of FIG. 4, in response to a memory access operation generated by compute complex 80 to access data, cache memory controller 84 determines whether the data is to be transferred between memory systems. For example, cache memory controller 84 may determine that the data indicated by the memory access operation is to be transferred between cache memory 82 and memory system 300. Data transferred between cache memory 82 and memory system 300 in response to the memory access operation are routed through cache memory controller circuit 84 and through the configurable memory assistance circuit 100. The configurable memory assistance circuit 100 accelerates the memory access operations generated by the compute complex 80 during the data transfer between cache memory circuit 82 and memory system 300, for example, by performing computations for an application running on compute complex 80 using the data.

The configurable memory assistance circuits 100 disclosed in any of the embodiments herein can be used to extend the capability of cache controller circuit 84. As an example, a configurable memory assistance circuit 100 can be used to perform in-line computations of data as objects that are fetched from memory system 300 as the data is transmitted to cache memory 82. As another example, a configurable memory assistance circuit 100 can be configured to perform linearization of multi-dimensional memory structure accesses from memory system 300 as the accessed data is transmitted to cache memory 82. A configurable memory assistance circuit 100 can also perform computations on data that is accessed from cache memory 82 and that is in transit to be stored in memory system 300 to accelerate the data transfer.

As another example, a configurable memory assistance circuit 100 can be configured to prefetch scattered memory blocks in a memory circuit and allow the scattered memory blocks to be linearly fetched by the cache controller 84. Prefetchers can be customized for an application where it is impractical to build a stride and pattern detection. Complex striding requirements, such as distance, degrees, multi-dimensional equations, etc., can be supported by the configurable memory assistance circuit 100.

As another example, a configurable memory assistance circuit 100 can be used as an extension of a cache controller replacement policy of cache controller 84. For a given application, the cache memory replacement policy can be extended using logic in the configurable memory assistance circuit 100.

As another example, a configurable memory assistance circuit 100 can be configured to perform speculative access generation. The configurable memory assistance circuit 100 can perform application specific speculative accesses of memory circuits, and then store the results of these accesses outside of cache memory (e.g., in system memory 300). A speculative memory access can be, for example, an access of a memory circuit that is not of the data requested by a read operation, but of data that may be requested in a subsequent read operation based upon a current read operation (e.g., the next consecutive address in memory).

As another example, a configurable memory assistance circuit 100 can be used as private memory. In this example, the configurable memory assistance circuit 100 can be configured as a specialized, private memory for a processor. The private memory may, for example, be only accessible by one processor or by one process or application running on the processor. The private memory can be specialized to be a ring-buffer, a first-in-first-out (FIFO) buffer, a last-in-first-out (LIFO) buffer, etc.

As another example, a configurable memory assistance circuit 100 can function as a private direct memory access (DMA) controller that allows an input/output (I/O) device to send or receive data directly to or from any one of the memory systems in system 92, bypassing one or more of the processors 80, to speed up memory access operations. As yet another example, a configurable memory assistance circuit 100 can be a last-level cache controller for an external memory system that is outside a cluster 20 or outside system 92. The configurable memory assistance circuit 100 can be used to adapt the last-level cache to specific requirements of the external memory system (e.g., page sizes, row/column access restrictions, etc.).

Figure 5:
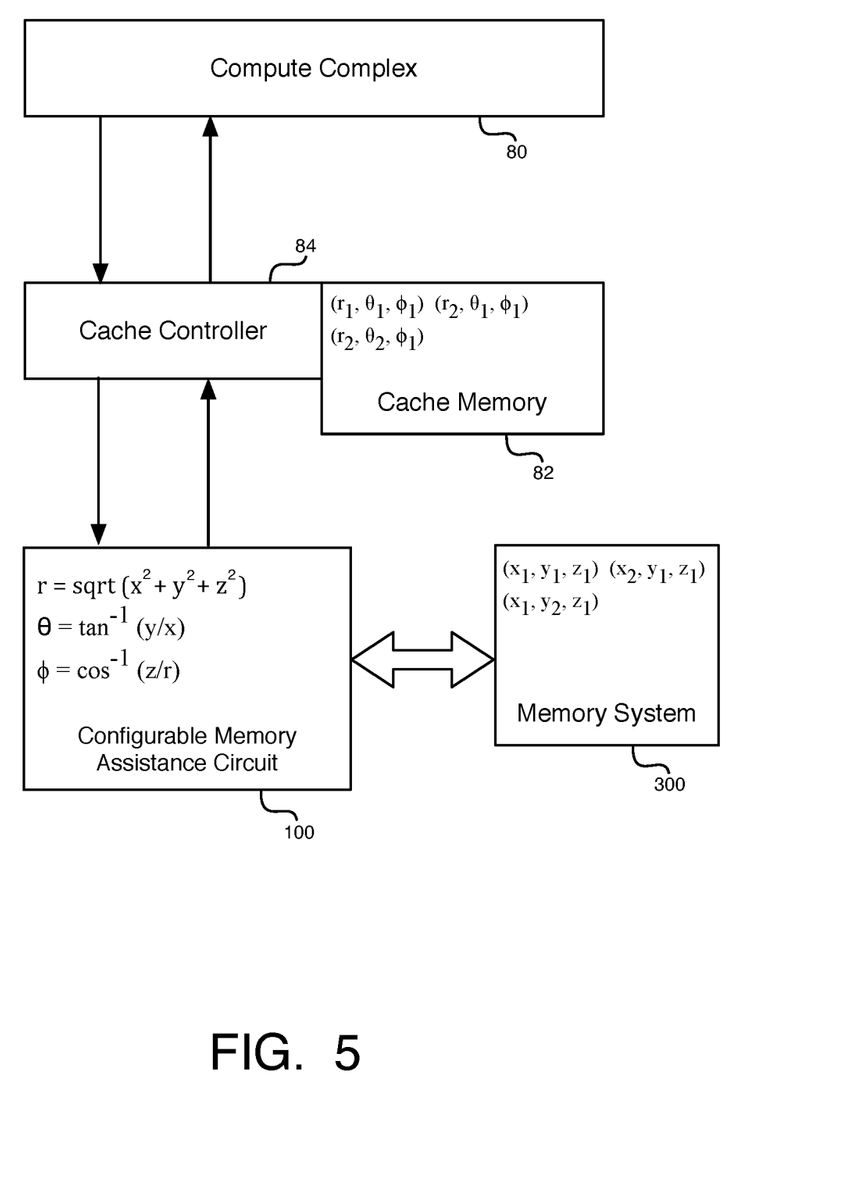
FIG. 5 illustrates an example of an application of a configurable memory assistance circuit for spherical coordinate processing of data stored as Cartesian coordinates in a memory system, according to an embodiment.

FIG. 5 illustrates an example of an application of a configurable memory assistance circuit for spherical coordinate processing of data stored as Cartesian coordinates in a memory system, according to an embodiment. In the embodiment of FIG. 5, data is stored as three dimensional (3D) Cartesian coordinates (x, y, z) in memory system 300, where x, y, and z are distances on three mutually perpendicular axes. The same data (or a subset of the data) that is stored in memory system 300 can be transferred to and stored in cache memory circuit 82 as 3D spherical coordinates (r, θ, φ), where r is the radial distance, θ is the polar angle, and φ is the azimuthal angle, in response to a memory access operation issued by compute complex 80. As the data is transferred between memory system 300 and cache memory circuit 82, configurable memory assistance circuit 100 converts the data between 3D Cartesian coordinates and 3D spherical coordinates, for example, using equations $r=\sqrt{x^2+y^2+z^2}$, $\theta=\tan^{-1}(y/x)$, and $\phi=\cos^{-1}(z/r)$, as shown in FIG. 5. The configurable memory assistance circuit 100 can perform a Cartesian prefetch of data from memory system 300 in response to a data transfer request from cache controller 84 that is generated in response to a memory access operation from compute complex 80. The configurable memory assistance circuit 100 can then convert the data from 3D Cartesian coordinates to 3D spherical coordinates before the converted data is stored in the cache memory 82 via cache controller 84. Also, the configurable memory assistance circuit 100 can receive data from cache memory 82 via cache controller 84 and then convert the received data from 3D spherical coordinates to 3D Cartesian coordinates before the converted data is transferred to and stored in the memory system 300. Configurable memory assistance circuit 100 of FIG. 5 can include any one of the configurable memory assistance circuits 100A-1, 100B-1, 100-2, or 100-3 of FIG. 1.

According to another embodiment, the configurable memory assistance circuit 100 of FIG. 5 converts data that is transferred between memory system 300 and cache memory circuit 82 between 3D Cartesian coordinates and 3D cylindrical coordinates. The configurable memory assistance circuit 100 can perform a Cartesian prefetch from memory system 300 and then convert the data from Cartesian coordinates to cylindrical coordinates before the converted data is stored in the cache memory 82 via cache controller 84. Also, the configurable memory assistance circuit 100 can receive data from cache memory 82 via cache controller 84 and then convert the received data from cylindrical coordinates to Cartesian coordinates before the converted data is transferred to and stored in the memory system 300.

Figure 6:
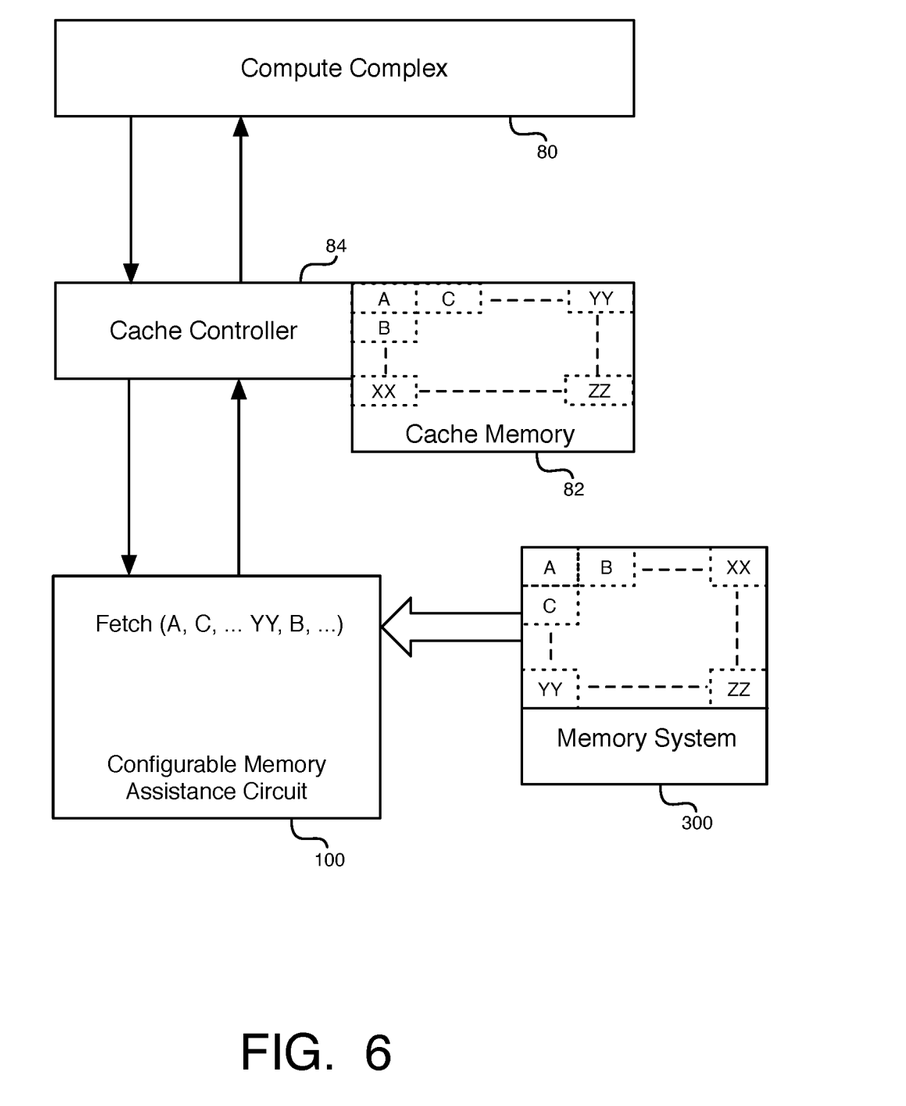
FIG. 6 illustrates an example of another application of a configurable memory assistance circuit for striding cache prefetch for video processing, according to an embodiment.

FIG. 6 illustrates an example of another application of a configurable memory assistance circuit for striding cache prefetch for video processing, according to an embodiment. Video processing by computers can be performed using two dimensional (2D) or three dimensional 3D tiles of pixels for images. Each image can be broken down into sections of tiles. The size and shape of these tiles are often application specific. In the embodiment of FIG. 6, video data is stored in memory system 300 as 2D or 3D tiles. The configurable memory assistance circuit 100 can perform a striding cache prefetch of the video data from memory system 300 in response to a data transfer request from cache controller 84 that is generated in response to a memory access operation from compute complex 80. The configurable memory assistance circuit 100 of FIG. 6 can include any one of the configurable memory assistance circuits 100A-1, 100B-1, 100-2, or 100-3 of FIG. 1.

The configurable memory assistance circuit 100 can then perform computations including tile extraction and address translation of the video data prefetched from memory system 300. The extracted and translated video data is then stored in cache memory 82 via cache controller 84. As a specific example that is not intended to be limiting, configurable memory assistance circuit 100 can convert rows of video data in the tiles stored in memory system 300 to columns of video data, as shown in FIG. 6. After being extracted and translated by the configurable memory assistance circuit 100, the video data is then stored in cache memory 82. The compute complex 80 (e.g., a processor) can then linearly access the video data from cache memory 82 via cache controller 84.

Figure 7:
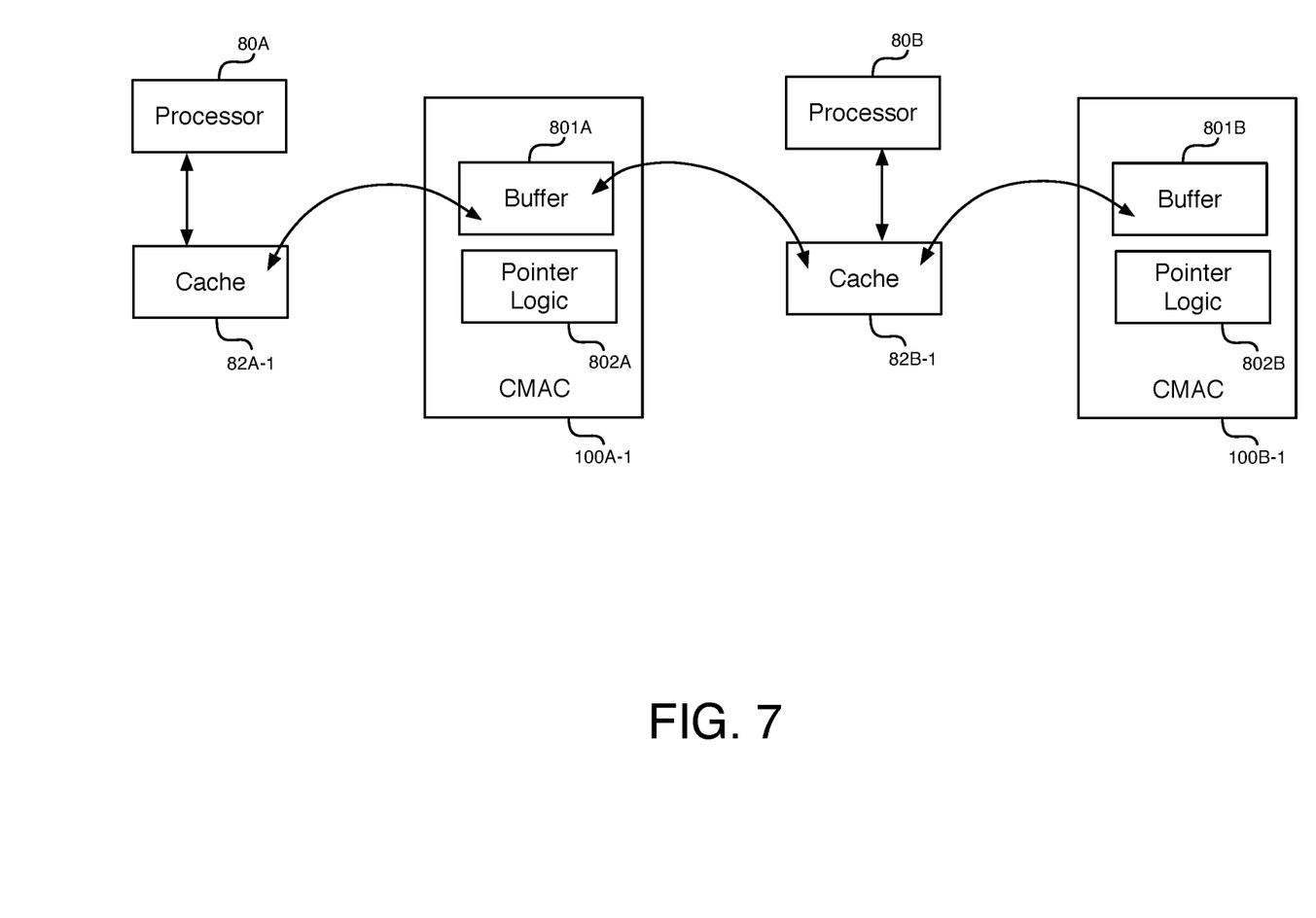
FIG. 7 illustrates an example of another application of a configurable memory assistance circuit, according to another embodiment.

FIG. 7 illustrates an example of another application of a configurable memory assistance circuit, according to another embodiment. FIG. 7 illustrates processor circuits 80A-80B, cache memory circuits 82A-1 and 82B-1, configurable memory assistance circuit (CMAC) 100A-1, and CMAC 100B-1. In the embodiment of FIG. 7, CMAC 100A-1 includes a buffer 801A and pointer logic 802A, and CMAC 100B-1 includes a buffer 801B and pointer logic 802B.

In the embodiment of FIG. 7, CMAC 100A-1 and CMAC 100B-1 are used to create shared buffers 801A-801B between cache memory circuits 82A-1 and 82B-1 for processors 80A and 80B that are performing operations on streaming data. In this embodiment, CMAC 100A-1 and CMAC 100B-1 coordinate the scheduling of memory accesses of data that is being transferred between cache memory circuits 82A-1 and 82B-1 using pointer logic 802A and 802B. Pointer logic 802A and 802B can indicate the source and the destination of data to be transferred between cache memory circuits 82A-1 and 82B-1. Pointer logic 802A-802B can also indicate a location where data in transit is currently stored and when to transfer the stored data to a different location.

As an example, streaming data can be transferred from cache memory 82A-1 to buffer 801A and then to cache memory 82B-1 and to buffer 801B in response to a memory access request by processor circuit 80B. Processor circuit 80B can then access the streaming data in cache memory 82B-1. The streaming data can be stored in buffer 801B for transfer to a cache memory 82 in processor cluster 20-2 to be accessible by a third processor circuit. Pointer logic 802A and/or 802B record the location of the streaming data as the streaming data is transferred from cache memory 82A-1 to cache memory 82B-1 and where the streaming data is to be transferred next. As another example, streaming data can be transferred from cache memory 82B-1 to buffer 801A and then to cache memory 82A-1 in response to a memory access request by processor circuit 80A. Processor circuit 80A can then access the streaming data in cache memory 82A-1. Processor circuits 80A and 80B can process the data incrementally using stream processing techniques without having access to all of the data.

The embodiment of FIG. 7 can eliminate the need for system memory sharing or coherent transactions. More specifically, using CMAC 100A-1 and CMAC 100B-1 as disclosed with respect to FIG. 7 can eliminate problems associated with changing multiple copies of data stored in different cache memory circuits for access by multiple processors or multiple processors accessing the same cache memory. Using CMAC 100A-1 and CMAC 100B-1 to implement data transfers between cache memory can also speed up data transfers between processors, because CMAC 100A-1 and CMAC 100B-1 can efficiently schedule and order the data transfers that are invisible to the applications running on the processors.

The following examples pertain to further embodiments. Example 1 is a computer system comprising: a processor circuit to run an application; a first memory system; a second memory system, wherein the application issues a memory access operation; and a configurable memory assistance circuit in communication with the first and second memory systems and the processor circuit, wherein the configurable memory assistance circuit accelerates the memory access operation for the application using data as the data is in transit between the first and second memory systems.

In Example 2, the computer system of Example 1 can optionally include a cache memory controller circuit that determines whether the data is to be transferred between the first and second memory systems in response to the memory access operation.

In Example 3, the computer system of any one of Examples 1-2 can optionally include wherein the first memory system is a cache memory circuit coupled to the processor circuit, and wherein the second memory system is a memory device that is external to a processor cluster that comprises the processor circuit and the cache memory circuit.

In Example 4, the computer system of any one of Examples 1-3 can optionally include wherein the computer system further comprises: an additional processor circuit in the processor cluster; a third memory system; and an additional configurable memory assistance circuit in communication with the additional processor circuit and the third memory system, wherein the additional configurable memory assistance circuit accelerates an additional memory access operation for the additional processor circuit using additional data as the additional data is in transit between the third memory system and one of the first and second memory systems.

In Example 5, the computer system of any one of Examples 1-4 can optionally include wherein the configurable memory assistance circuit accelerates the memory access operation by converting the data between a first coordinate system and a second coordinate system.

In Example 6, the computer system of any one of Examples 1-5 can optionally include wherein the configurable memory assistance circuit accelerates the memory access operation by performing tile extraction and address translation of video data prefetched from the first memory system and then provides extracted and translated video data for storage in the second memory system.

In Example 7, the computer system of any one of Examples 1-6 can optionally include wherein the configurable memory assistance circuit comprises pointer logic and a buffer, wherein the buffer stores the data as the data is in transit between the first and second memory systems, and wherein the pointer logic accelerates the memory access operation by coordinating scheduling of memory accesses of the data that is being transferred between the first and second memory systems.

In Example 8, the computer system of any one of Examples 1-7 can optionally include wherein the configurable memory assistance circuit functions as a private direct memory access controller that allows an input/output device to send and receive data directly to and from the first or second memory system, bypassing the processor circuit.

In Example 9, the computer system of any one of Examples 1-8 can optionally include wherein the configurable memory assistance circuit performs speculative access of the data stored in the first memory system and then stores results of the speculative access of the data in the second memory system.

In Example 10, the computer system of any one of Examples 1-9 can optionally include wherein the configurable memory assistance circuit comprises configurable logic array blocks, random access memory blocks, and digital signal processing blocks.

Example 11 is a method for accelerating memory access operations using data in transit between memory systems in a computer system, the method comprising: running an application on a processor circuit in the computer system; storing data in a first memory system in the computer system; transferring the data from the first memory system to a second memory system in the computer system in response to a memory access operation generated by the processor circuit; and accelerating the memory access operation using the data with a configurable memory assistance circuit in the computer system as the data is in transit between the first and second memory systems.

In Example 12, the method of Example 11 can optionally include wherein at least one of the first memory system or the second memory system is a cache memory circuit coupled to the processor circuit.

In Example 13, the method of any one of Examples 11-12 can optionally include wherein at least one of the first memory system or the second memory system is a memory device that is external to a processor cluster that comprises the processor circuit and the cache memory circuit.

In Example 14, the method of any one of Examples 11-13 can optionally include wherein both of the first memory system and the second memory system are memory devices that are external to the processor circuit and a circuit board coupled to the processor circuit.

In Example 15, the method of any one of Examples 11-14 can optionally include wherein accelerating the memory access operation using the data with the configurable memory assistance circuit in the computer system as the data is in transit between the first and second memory systems further comprises: performing tile extraction and address translation of video data prefetched from the first memory system using the configurable memory assistance circuit; and providing extracted and translated video data for storage in the second memory system.

In Example 16, the method of any one of Examples 11-15 can optionally include wherein accelerating the memory access operation using the data with the configurable memory assistance circuit in the computer system as the data is in transit between the first and second memory systems further comprises: storing the data in a buffer in the configurable memory assistance circuit as the data is in transit between the first and second memory systems; and transferring the data from the first memory system to the second memory system based on pointers stored in pointer logic in the configurable memory assistance circuit that indicate a source of the data, a destination of the data, and a location where the data is currently stored.

In Example 17, the method of any one of Examples 11-16 can optionally include wherein accelerating the memory access operation using the data with the configurable memory assistance circuit in the computer system as the data is in transit between the first and second memory systems further comprises: converting the data between Cartesian coordinates and spherical or cylindrical coordinates with the configurable memory assistance circuit.

Example 18 is a computer system comprising: a processor circuit; a first memory system; a second memory system, wherein the processor circuit issues a memory access operation; and a configurable memory assistance circuit in communication with the first and second memory systems and the processor circuit, wherein the configurable memory assistance circuit comprises configurable logic circuits that are configurable to accelerate the memory access operation by performing computations on data while the data is in transit from the first memory system to the second memory system.

In Example 19, the computer system of Example 18 can optionally include wherein at least one of the first memory system or the second memory system is a memory device that is external to an integrated circuit that comprises the processor circuit and a cache memory circuit.

In Example 20, the computer system of any one of Examples 18-19 can optionally include wherein at least one of the first memory system or the second memory system is a cache memory circuit in an integrated circuit with the processor circuit.

In Example 21, the computer system of any one of Examples 18-20 can optionally include a cache memory controller circuit that determines whether the data is to be transferred between the first and second memory systems in response to the memory access operation, wherein the cache memory controller circuit coordinates the transfer of the data between the first and second memory systems.

The foregoing description of the exemplary embodiments of the present invention has been presented for the purpose of illustration. The foregoing description is not intended to be exhaustive or to limit the present invention to the examples disclosed herein. In some instances, features of the present invention can be employed without a corresponding use of other features as set forth. Many modifications, substitutions, and variations are possible in light of the above teachings, without departing from the scope of the present invention.

What is claimed is:

1. A computer system comprising:
 a processor circuit to run an application;
 a first memory system;
 a second memory system, wherein the application issues a memory access operation; and
 a configurable memory assistance circuit in communication with the first and second memory systems and the processor circuit, wherein the configurable memory assistance circuit accelerates the memory access operation for the application by performing computations for the application on data as the data is in transit between the first and second memory systems.

2. The computer system of claim 1 further comprising:
 a cache memory controller circuit that determines whether the data is to be transferred between the first and second memory systems in response to the memory access operation.

3. The computer system of claim 1, wherein the first memory system is a cache memory circuit coupled to the processor circuit, and wherein the second memory system is a memory device that is external to a processor cluster that comprises the processor circuit and the cache memory circuit.

4. The computer system of claim 3, wherein the computer system further comprises:
 an additional processor circuit in the processor cluster;
 a third memory system; and
 an additional configurable memory assistance circuit in communication with the additional processor circuit and the third memory system, wherein the additional configurable memory assistance circuit accelerates an additional memory access operation for the additional processor circuit using additional data as the additional data is in transit between the third memory system and one of the first or second memory systems.

5. The computer system of claim 1, wherein the configurable memory assistance circuit accelerates the memory access operation by converting the data between a first coordinate system and a second coordinate system.

6. The computer system of claim 1, wherein the configurable memory assistance circuit accelerates the memory access operation by performing tile extraction and address translation of video data prefetched from the first memory system and then provides extracted and translated video data for storage in the second memory system.

7. The computer system of claim 1, wherein the configurable memory assistance circuit comprises pointer logic and a buffer, wherein the buffer stores the data as the data is in transit between the first and second memory systems, and wherein the pointer logic accelerates the memory access operation by coordinating scheduling of memory accesses of the data that is being transferred between the first and second memory systems.

8. The computer system of claim 1, wherein the configurable memory assistance circuit functions as a private direct memory access controller that allows an input/output device to send and receive data directly to and from the first or second memory system, bypassing the processor circuit.

9. The computer system of claim 1, wherein the configurable memory assistance circuit performs speculative access of the data stored in the first memory system and then stores results of the speculative access of the data in the second memory system.

10. The computer system of claim 1, wherein the configurable memory assistance circuit comprises configurable logic array blocks, random access memory blocks, and digital signal processing blocks.

11. A method for accelerating memory access operations using data in transit between memory systems in a computer system, the method comprising:
 running an application on a processor circuit in the computer system;
 storing data in a first memory system in the computer system;
 transferring the data from the first memory system to a second memory system in the computer system in response to a memory access operation generated by the processor circuit; and
 accelerating the memory access operation using the data with a configurable memory assistance circuit in the computer system by performing computations for the application on the data as the data is in transit between the first and second memory systems.

12. The method of claim 11, wherein at least one of the first memory system or the second memory system is a cache memory circuit coupled to the processor circuit.

13. The method of claim 12, wherein at least one of the first memory system or the second memory system is a memory device that is external to a processor cluster that comprises the processor circuit and the cache memory circuit.

14. The method of claim 11, wherein both of the first memory system and the second memory system are memory devices that are external to the processor circuit and a circuit board coupled to the processor circuit.

15. The method of claim 11, wherein accelerating the memory access operation using the data with the configurable memory assistance circuit in the computer system as the data is in transit between the first and second memory systems further comprises:
 performing tile extraction and address translation of video data prefetched from the first memory system using the configurable memory assistance circuit; and
 providing extracted and translated video data for storage in the second memory system.

16. The method of claim 11, wherein accelerating the memory access operation using the data with the configurable memory assistance circuit in the computer system as the data is in transit between the first and second memory systems further comprises:
 storing the data in a buffer in the configurable memory assistance circuit as the data is in transit between the first and second memory systems; and
 transferring the data from the first memory system to the second memory system based on pointers stored in pointer logic in the configurable memory assistance circuit that indicate a source of the data, a destination of the data, and a location where the data is currently stored.

17. The method of claim 11, wherein accelerating the memory access operation using the data with the configurable memory assistance circuit in the computer system as the data is in transit between the first and second memory systems further comprises:
  converting the data between Cartesian coordinates and spherical or cylindrical coordinates with the configurable memory assistance circuit.

18. A computer system comprising:
  a processor circuit;
  a first memory system;
  a second memory system, wherein the processor circuit issues a memory access operation; and
  a configurable memory assistance circuit in communication with the first and second memory systems and the processor circuit, wherein the configurable memory assistance circuit comprises configurable logic circuits that are configurable to accelerate the memory access operation by performing computations on data while the data is in transit from the first memory system to the second memory system.

19. The computer system of claim 18, wherein at least one of the first memory system or the second memory system is a memory device that is external to an integrated circuit that comprises the processor circuit and a cache memory circuit.

20. The computer system of claim 18, wherein at least one of the first memory system or the second memory system is a cache memory circuit in an integrated circuit with the processor circuit.

21. The computer system of claim 18 further comprising:
  a cache memory controller circuit that determines whether the data is to be transferred between the first and second memory systems in response to the memory access operation, wherein the cache memory controller circuit coordinates the transfer of the data between the first and second memory systems.

* * * * *